UNITED STATES PATENT OFFICE.

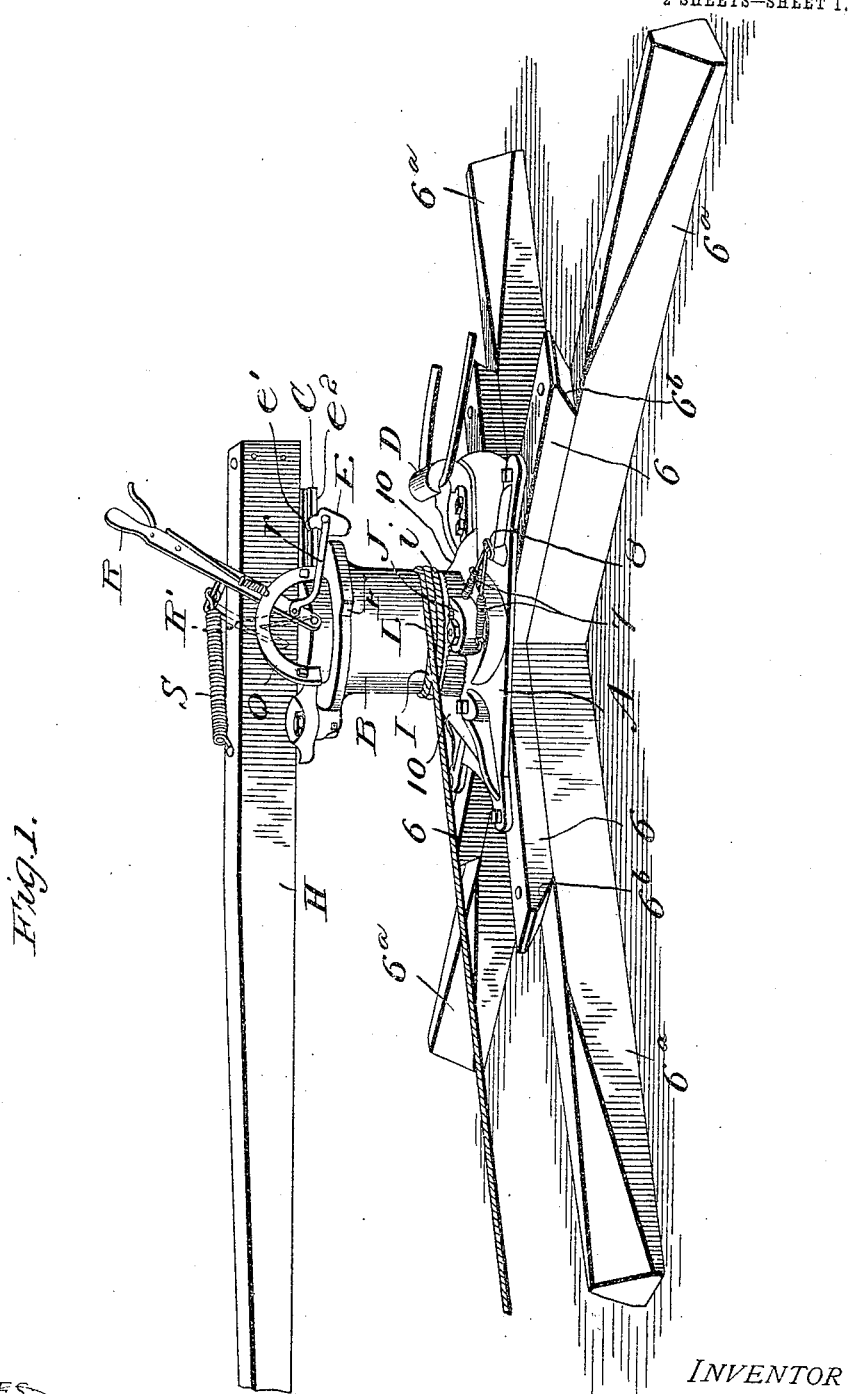

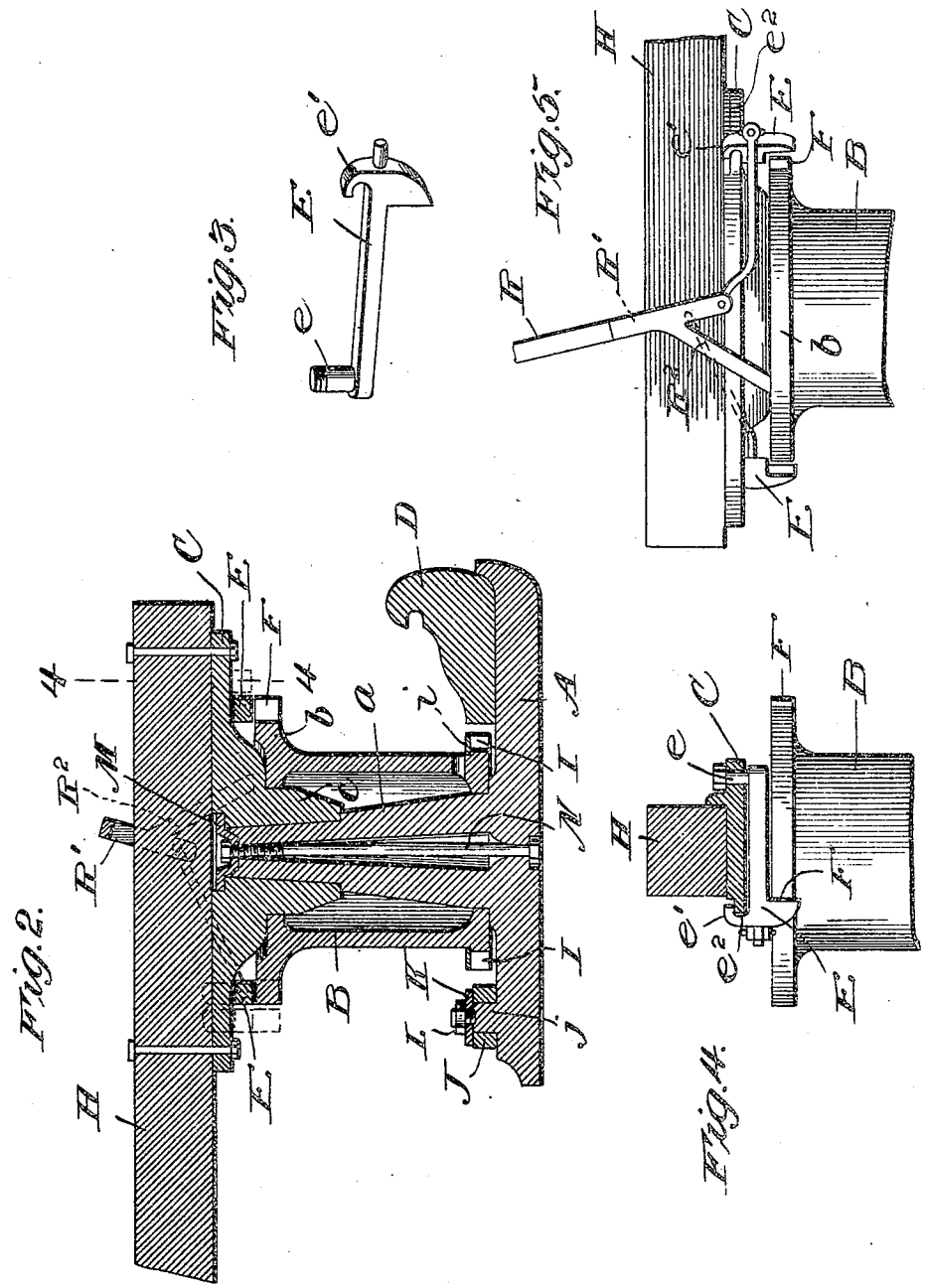

JOSEPH J. MILNE, OF MONMOUTH, ILLINOIS, ASSIGNOR TO MILNE MANUFACTURING COMPANY, OF MONMOUTH, ILLINOIS.

STUMP-PULLER.

No. 808,247.     Specification of Letters Patent.     Patented Dec. 26, 1905.

Application filed June 13, 1905. Serial No. 265,016.

*To all whom it may concern:*

Be it known that I, JOSEPH J. MILNE, a citizen of the United States, residing at Monmouth, in the county of Warren and State of Illinois, have invented new and useful Improvements in Stump-Pullers, of which the following is a specification.

This invention is a stump-puller of the lever-and-drum type.

The objects of the invention are to improve the means and manner of engaging the dogs carried by the sweep-plate with the drum, to provide a machine which can be either anchored to a stump or on base-timbers as a self-anchored machine, to improve the manner of mounting the sweep and its plate upon the bed-plate and drum, to secure increased rigidity and strength, to improve the construction of the base with respect to the manner in which the drum is mounted thereon, to assemble the parts by a single king-bolt, which holds them together and admits of the machine being quickly and easily taken apart, to form a rope-guard to keep the rope out of the ratchet, and to improve such a machine otherwise, as may be apparent from the following description and the claims.

In the drawings, Figure 1 is a perspective view of the machine. Fig. 2 is a central vertical section. Fig. 3 is a detail of one of the dogs which engage between the sweep-plate and the drum. Fig. 4 is a detail in section on the line 4 4 of Fig. 2, illustrating the attachment of the dog to the sweep-plate. Fig. 5 is a detail in side elevation.

Referring specifically to the drawings, A indicates the bed-plate, mounted upon shoes 6, to which may be attached the base-timbers 6ª. The shoes may be placed on the bed-plate either parallel or crosswise with each other, and their ends are beveled on the under side, as at 6ᵇ, so that the machine will slide on the ground around a stump when anchored thereto. This bed-plate has a central hollow circular post $a$ and also an anchor-block D bolted thereto. In the use of these devices it is frequently desirable to anchor the machine either to a stump or to the ground upon base-timbers. When anchored to a stump, the pull is necessarily in one direction; but when anchored upon the ground the pull can be in various directions without moving the machine. By means of the anchor-hook D the machine can be connected to a stump when desired, and the anchor-hook projects up beside the drum to a certain extent, so that the strain is brought substantially in line with the anchor. For use as a self-anchored machine the anchor-hook is unbolted and removed, thereby giving the pull-rope a clear swing in every direction from the machine.

B indicates the hollow winding-drum. This fits at the bottom upon the bed-plate around the base of post $a$ and has at its lower flange a ratchet I, engaged by a pawl J, fixed upon a pivot-post $j$, cast on the bed-plate and held there by a nut L and washer K. Above the ratchet is a guard-ring $i$, which extends out to the point of the teeth and which prevents the rope from getting entangled in the pawl and ratchet, and inclined ribs 10 on the bed-plate assist in the same result, as the rope will ride up the ribs above the ratchet. The pawl is connected on opposite sides of its pivot by springs 7 to a trigger or lever 8, pivoted on the bed-plate. This trigger can be pulled with the hand or kicked around with the foot beyond the center to throw the pawl in or out of action.

At the upper end of the drum a flange $b$ projects, having notches F to receive the dogs E, by which the machine is put in or out of gear. This flange forms an upper guard for the rope and also increases the leverage on the drum by throwing the engagement with the dogs out as far from the center as possible.

The sweep-seat is indicated at C, comprising a strong casting to which the sweep H is attached, to which sweep the team is hitched. The sweep-seat casting has a long hub $c$ on its under side, which fits down over the center post $a$ and through the upper head of the drum, upon which it rests. This sustains the sweep in a horizontal position, and when the machine is in action the sweep-seat and drum move together around the center post.

One of the dogs E is attached to each end of the sweep-seat. It is pivoted to swing horizontally on the under side of the sweep-seat by means of a pivot-pin $e$ at the inner end fitting in a hole in the sweep-seat and has at the outer end a lip $e'$, which engages over the edge $e$ of the plate of the sweep-seat and holds the dog in place, so that it may swing in or out of engagement with one of the notches F. These dogs are operated by a lever R, pivoted upon the sweep-seat, one dog being directly connected to the lever by a rod r and the other being connected to an extension R′, extending from the lever over to the other side of the sweep. A coiled spring S, connected between the lever and the sweep, serves to throw the dogs in engagement when the latch of the lever is released from the segment Q. The dogs may be held out of engagement by pulling the lever back and engaging the latch in the notch in the segment.

The parts of the machine are held together by means of a king-bolt N, which extends through the post $a$ and has a nut fitting over a washer M, the edge of which extends into a rebbet in the hub of the sweep-seat and so holds the same in place. By removing the nut the machine can be at once lifted apart—first the washer, then the sweep-seat, and then the drum.

The operation of the machine will be evident from the above description. It may be remarked that the lever arrangement for engaging the dogs permits them to be disengaged at any time, even while under strain, and on releasing the lever the dogs instantly swing back to complete engagement. The engaging devices are all on the outside and in plain sight. The drum has a wide and strong bearing, and the strain is so disposed as to give great rigidity and strength for the material used. The extension R′ also carries the drum-brake, which consists of a piece of iron $R^2$, which branches off from the rear side of the extension R′ and projects downward at such an angle that when the lever is thrown back a little farther than is necessary to disengage the dogs E the end of the arm $R^2$ comes in contact with the top or head of the drum and forms a rub-brake to control the running off of slack from the drum.

What I claim as new, and desire to secure by Letters Patent, is—

1. The combination of a bed-plate having a central post, a winding-drum mounted thereon, and a sweep-seat having a depending hub fitting over the upper end of the post within the top of the drum.

2. The combination of a bed-plate having a central post, a winding-drum around the post and fitting at its lower head upon the same, a sweep-seat having a depending hub fitting between the upper end of the post and the top of the drum, and a king-bolt connecting the sweep-seat and the base-plate.

3. The combination of a winding-drum having a notched flange, a sweep-seat, a dog pivoted on the seat and engageable with one of the notches, and a lever pivoted on the seat and connected to the dog and having a spring tending to throw the dog in engagement.

4. A pulling device having a base-plate and an upright winding-drum thereon, and an anchor-hook detachably secured to the base-plates and projecting up beside the drum, to balance the strain thereon.

5. A winding-drum having a ratchet at the end, and a rope-guard flange projecting between the ratchet and the body of the drum.

6. The combination of a notched winding-drum, a sweep-seat thereon, and a horizontally-swinging dog pivoted on the under side of the sweep-seat and having a lip which hooks over the edge thereof, the dog being engageable with one of the notches.

7. The combination of a bed-plate having a central post, a winding-drum thereon having a ratchet at the lower end, and ribs projecting upwardly from the bed-plate around the lower end of the drum to prevent the rope from getting down under the drum and coming in contact with the ratchet.

8. A stump-puller the bed-plate of which is fastened on shoes, which may be placed either crosswise or parallel to each other, said shoes having beveled ends so as to slide freely on the ground when the machine is anchored to a stump, and an anchor-hook detachably secured to the bed-plate, so that it may be removed when the machine is self-anchored.

9. The combination with a sweep-seat and drum, of means including a lever to connect or disconnect them, to throw the machine in or out of gear, and a drum-brake connected to and operated by said lever, and which when the machine is thrown out of gear may be brought in contact with the drum to retard or control its back slip when the rope is being drawn off.

In testimony whereof I have signed my name to this specification in the presence of two subscribing witnesses.

JOSEPH J. MILNE.

Witnesses:
R. M. THOMAS,
VERE HUGHES.